United States Patent

Anderson

[15] 3,649,058
[45] Mar. 14, 1972

[54] TORQUE TRANSMITTING COUPLING
[72] Inventor: James H. Anderson, York, Pa.
[73] Assignee: Coupling Corporation of America, New Hope, Va.
[22] Filed: Mar. 31, 1970
[21] Appl. No.: 24,174

[52] U.S. Cl..................................287/129, 287/130, 287/53
[51] Int. Cl............................................................F16d 1/04
[58] Field of Search ...................................287/53, 129, 130

[56] References Cited

UNITED STATES PATENTS

| | | | |
|---|---|---|---|
| 2,585,113 | 2/1952 | Gredell | 287/129 X |
| 2,617,672 | 11/1952 | Nichols | 287/129 X |
| 2,634,991 | 4/1953 | Stevens | 287/53 |
| 3,097,006 | 7/1963 | Logue | 287/129 |
| 3,500,660 | 3/1970 | Anderson | 287/129 X |

FOREIGN PATENTS OR APPLICATIONS

| | | | |
|---|---|---|---|
| 776,357 | 6/1957 | Great Britain | 287/53 |
| 996,382 | 6/1965 | Great Britain | 287/129 |

Primary Examiner—Andrew V. Kundrat
Attorney—Kemon, Palmer & Estabrook

[57] ABSTRACT

A specialized form of splined coupling is disclosed in which the mating surfaces are lobed. The configuration of the lobes is such that their radius varies continuously from a minimum to a maximum and back to the minimum. There are at least two such lobes on each shaft preferably occupying the entire periphery thereof and preferably spaced from each other around the periphery of the shaft by $(360/N)°$ where N equals the number of lobes.

5 Claims, 9 Drawing Figures

Patented March 14, 1972
3,649,058
2 Sheets-Sheet 1
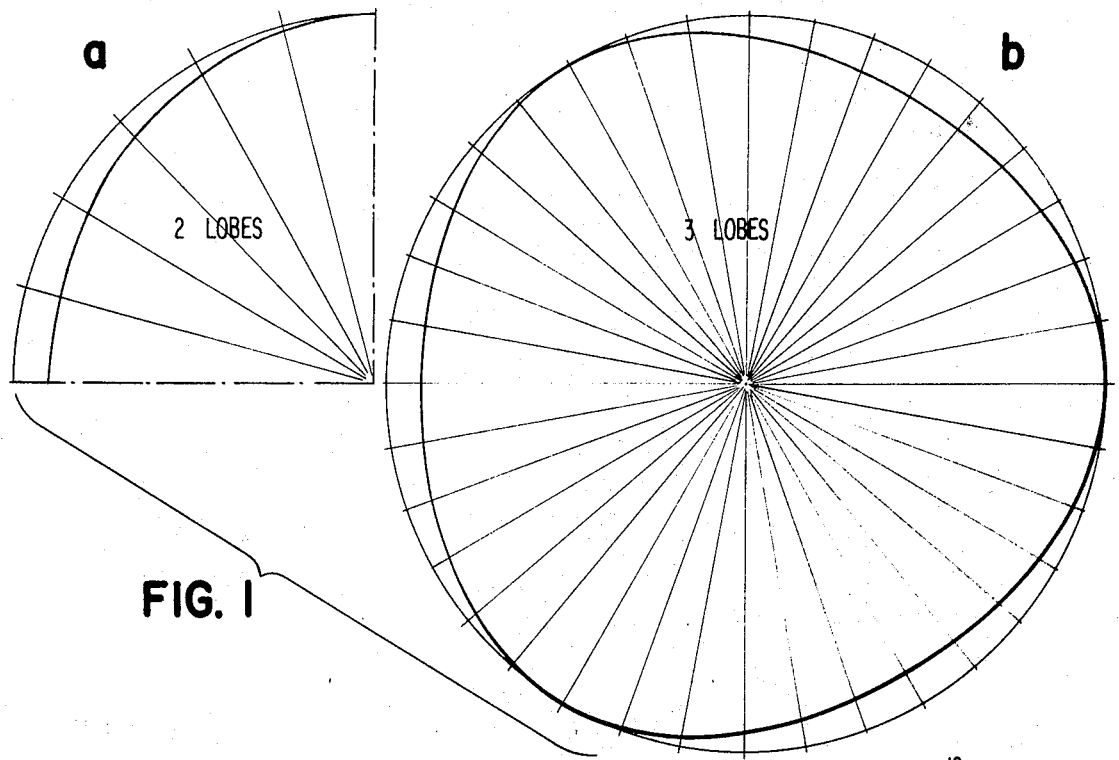
FIG. 1
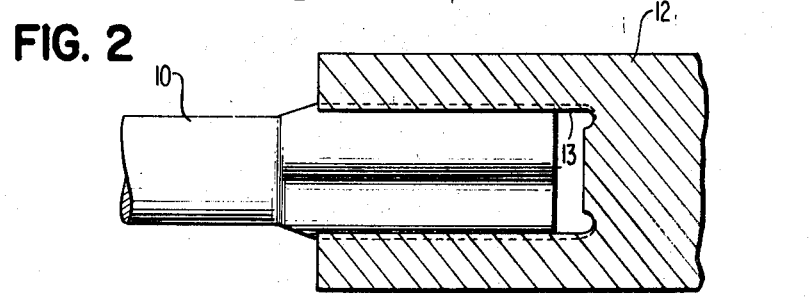
FIG. 2
FIG. 3
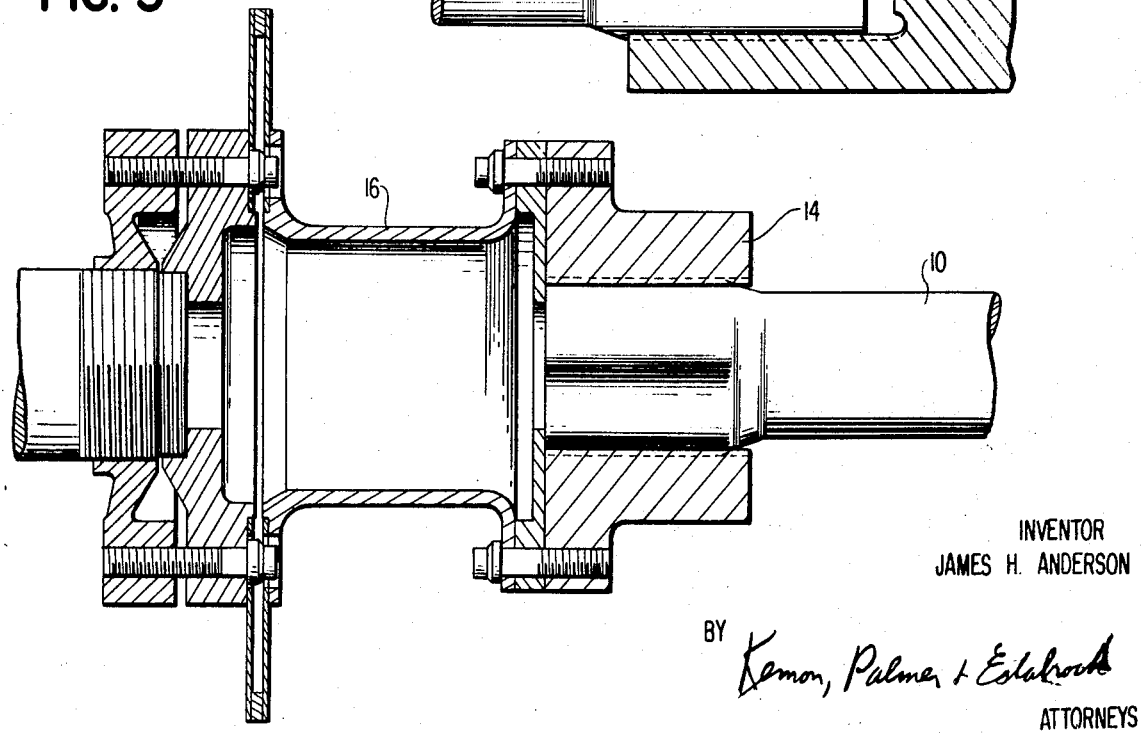
INVENTOR
JAMES H. ANDERSON
BY Kenyon, Palmer & Estabrook
ATTORNEYS Patented March 14, 1972  3,649,058

TORQUE TRANSMITTING COUPLING

CROSS REFERENCE TO RELATED CASES

The coupling of the present invention is an improvement over and is useful in connection with those shown in my prior U.S. application Ser. No. 779,125, filed Nov. 26, 1968 and now U.S. Pat. No. 3,500,660.

BACKGROUND OF THE INVENTION

Coupling of the prior art for transmitting torque between aligned shafts are generally either of the splined, screw, or bolted flange type and each has certain shortcomings. A splined coupling generally has sufficient play that axial movement between the shafts is always possible. A screw coupling requires as much torque to take apart as it does to set up. There is a need therefore for a coupling which is capable of transmitting high torque, which is self-aligning, which may be disassembled with a minimum of reverse torque and which is easily machinable.

BRIEF SUMMARY OF THE INVENTION

In accordance with the present invention, a new form of coupling for use in transmitting torque between aligned shafts is provided in which the mating surfaces of the two halves of the coupling have a peripherally lobed configuration. Each lobe is of a particular shape which may be defined as one in which the radius varies continuously from a minimum to a maximum and back to the minimum. There are at least two such lobes on each member and they cover the entire periphery of the coupling so that there is no portion of the coupling periphery which is either circular or straight.

BRIEF DESCRIPTION OF THE DRAWINGS

FIG. 1 is a layout of the surface of a coupling member in accordance with the present invention, FIG. 1a showing a partial surface configuration for a two-lobe coupling and FIG. 1b showing the entire surface configuration for a three-lobe coupling;

FIG. 2 is a plan view partially in section of a pair of coupling members in their coupled position;

FIG. 3 is a view similar to FIG. 2 but in which the female coupling member is in the form of a hub bolted to a hollow shaft;

FIG. 4a is an end view of the coupling of FIG. 4 on the line 4a—4a;

DETAILED DESCRIPTION OF THE INVENTION

Figure 4:
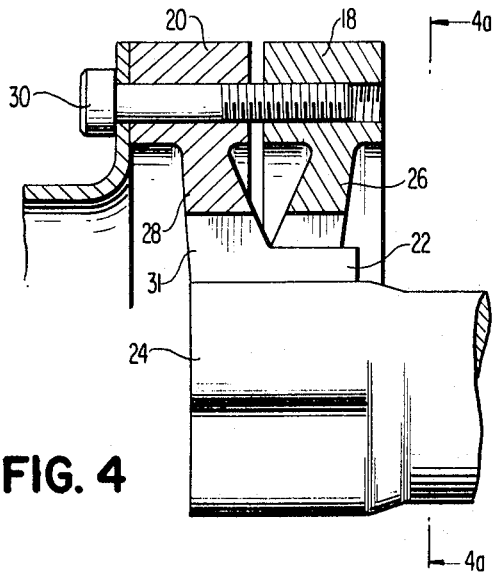
FIG. 4 is an alternative embodiment of the present invention in which the female member of the coupling comprises a pair of bolting flanges.

Referring first to FIGS. 1a and 1b of the drawings, it may be helpful to define the shape of the peripheral surfaces of the coupling members by defining the manner in which they are machined. It is contemplated that these couplings may be machined on a lathe which is modified so that the lathe toolpost rather than being fixed in one position to turn a circle, is moved radially in and out in timed relation to rotation of the headstock. Such radial motion could of course be generated by a crank or eccentric which is geared to the headstock. Depending upon the gearing ratio between the toolholder and the headstock, the toolholder can be set to reciprocate at two or more revolutions for each revolution of the headstock. For any integral gear ratio of two or more, the eccentric motion will move the tool radially in and out to generate a lobular shape as shown on the two drawings in FIG. 1. Because of the manner in which the curve is generated, it may be defined as a harmonically generated curve superimposed on a base circle. In FIG. 1a, a two-lobed coupling member is shown but only 90° is illustrated since the remaining portion will be symmetrical with respect to the 90° segment illustrated. FIG. 1b shows a complete 360° layout for a three-lobe configuration of coupling member. From this view it will be apparent that in the three-lobed embodiment, there is a spacing of 120° between each corresponding portion of each of the three lobes. The three lobes occupy the entire periphery of the shaft and for this reason there is no portion (other than an infinitely small one) of the shaft which is either circular or straight and there are no sharp corners between adjacent lobes. Of course, the layouts of FIGS. 1a and 1b show only the male half of the coupling but it will be readily appreciated that the female half can be similarly machined in order to mate with the male half.

In FIG. 2 of the drawings, a torque transmitting coupling in accordance with the present invention is shown in what is perhaps its simplest form. The two shafts to be coupled are indicated by the reference numerals 10 and 12. The male half of the coupling is simply machined on the exterior surface of the end portion of the shaft 10. The female portion is machined internally on the surface of a bore 13 on the end of the shaft 12. Obviously, the shaft 12 can be of the same diameter as the shaft 10 with an enlarged end in which the female half of the coupling is machined or the entire shaft 12 could be the same diameter as the coupling portion.

While, as stated before, there can be any number of lobes on the shaft so long as that number is two or more, the preferred embodiment is a three-lobe shape by reason of the fact that the three basic areas of contact between halves of the coupling are adequate to center a shaft inside a bore even though there is slight clearance in the fit. Also, it is easier to operate the eccentric only three times the lathe speed than at greater speeds. It should be noted, however, that there are special cases which would dictate more than three lobes.

In FIG. 3 of the drawings the lobed coupling is shown incorporated in a flexible shaft coupling of the type described in the aforementioned copending application. In this instance, the female half of the coupling is in the form of a hub 14 which is bolted or otherwise suitably affixed to the sleeve member 16 which at its opposite end is connected to one-half of the flexible coupling arrangement shown and described in my aforementioned copending application. The male half of the coupling is machined on the shaft 10 as in FIG. 2.

Figure 4A:
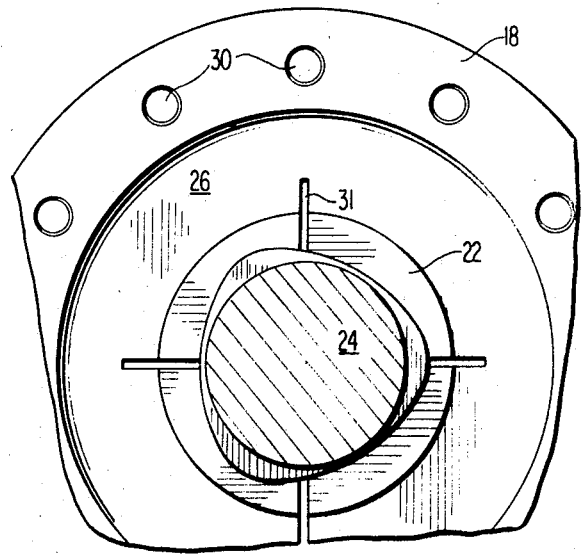

Referring next to FIGS. 4 and 4a of the drawings, a still further embodiment of the present invention is shown in which the female portion of the coupling comprises a pair of bolting flanges 18 and 20. As described in the aforementioned copending application, the flange 20 includes an integral sleeve portion 22 and it is the internal surface of this sleeve which is machined in the same lobular configuration previously described. The male portion of the coupling is machined on the exterior of the end portion of the shaft 24. The flange 18 has an inner bore sized to smoothly surround the cylindrical outer surface of the sleeve 22 and both flanges include angularly disposed strut portions 26 and 28 which when the bolts 30 are placed in tension, deflect in a direction to decrease their internal diameters and thereby cause the two halves of the coupling to firmly engage with each other. Also as indicated in this Figure, the strut members 26 and 28 may be slotted as indicated at 31 in order to increase their flexibility.

Figure 5:
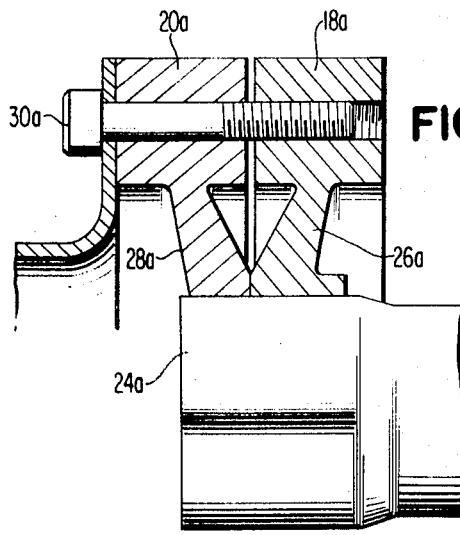
FIG. 5 is a modification of the device shown in FIG. 4.

Turning now to FIG. 5 of the attached drawings, a modification of the bolting flange coupling of FIG. 4 is shown in which the inner bores of both of the strutted portions 26a and 28a of the bolting flanges 18a and 20a are each machined in a lobular configuration to mate with the lobes on the periphery of the shaft. In this case, the struts react against each other at their inner ends in response to tensioning of the flange bolts 30a and deflect to decrease their internal diameter and thus cause the two parts of the coupling to firmly engage.

Figure 7:
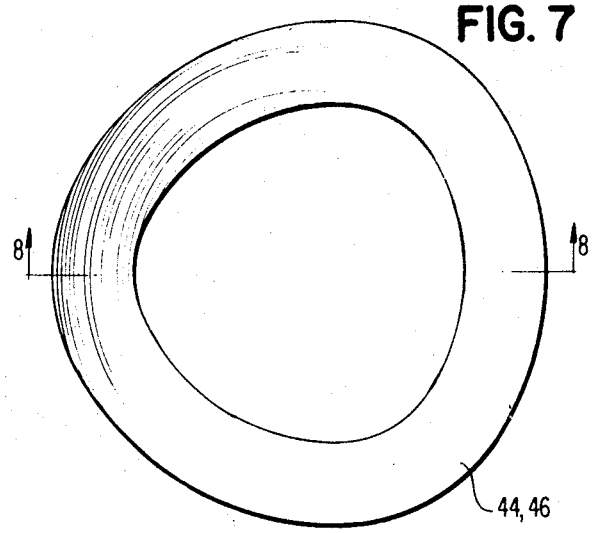
FIG. 7 is a plan view of a Belleville Spring modified for use in the modification of FIG. 6.
Figure 6:
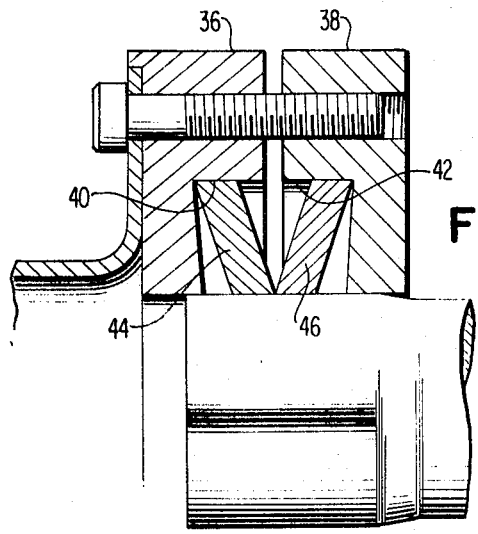
FIG. 6 is another modification of the device shown in FIG. 4.
Figure 8:
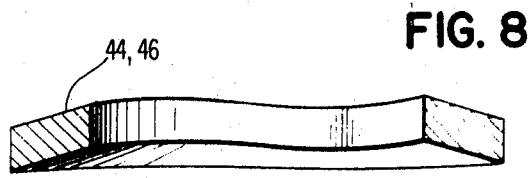
FIG. 8 is a section on the lines 8—8 of FIG. 7.

Turning lastly to FIGS. 6, 7 and 8 of the drawings, a still further modification of the bolting flange type of coupling is shown. In this embodiment, the two halves of the flange 36 and 38 are symmetrical and in their assembled position include facing lobed counterbores 40 and 42 of substantially larger nominal diameter than the diameter of the lobed portion of the shaft. Positioned within the counterbores are a pair of Belleville springs 44 and 46. The external periphery of these springs is lobed as shown in FIG. 7 to mate with the counterbores 40 and 42 of the flanges 36 and 38. The inner periphery of the spring members is also machined in a lobular configuration in order to mate with the lobular configuration on the end of the shaft. Likewise, the inner bores of the flanges 36 and 38 are similarly machined to mate with the shaft.

As an example of one possible use of lobular joints in accordance with the invention, it would be very practical to form a drill shank with a trilobular end portion. Such a drill could then be used equally well in a three jaw chuck or trilobular female chuck. By including a square or hex section on the shank or even a pair of flats, the drill could be loosened from a trilobular chuck by wrapping a wrench on that portion of the shank. An analogous use would be to join a milling cutter to a trilobular spindle. Obviously the coupling will have utility for a wide range of applications whenever a quick releasable and self-aligning torque transmitting coupling is required.

While preferred embodiments are herein illustrated and described, applicant claims the benefit of a full range of equivalents within the scope of the appended claims.

I claim:

1. A coupling for transmitting torque between shafts comprising in combination:
   a. an input and an output shaft in substantially aligned relation to each other,
      a 1. an end portion of one of said shafts having a peripheral surface consisting of at least two lobes of continuously varying radius and spaced circumferentially from each other by $(360/N)°$ where N equals the number of lobes; and
   b. a pair of cone-shaped bolting flanges surrounding said end portion, at least one of said flanges having an internal bore with a configuration to mate with said end portion, said flanges being secured to the other of said shafts with the small ends of the cones adjacent each other; and
   c. means for drawing the bases of said cones toward each other.

2. The combination defined by claim 1 in which both of said cone-shaped bolting flanges have an internal bore configured to mate with said end portion.

3. The combination defined by claim 1 in which one of said bolting flanges includes an integral externally cylindrical sleeve and said bore extends through said sleeve and the other bolting flange is annular and smoothly surrounds said sleeve.

4. The combination defined by claim 1 in which said bolting flanges are slotted and the slots extend from the inner surface of said bore radially outwardly to increase the flexibility of said flanges.

5. A coupling for transmitting torque between shafts comprising in combination:
   a. an input and an output shaft is substantially aligned relation to each other,
      a 1. an end portion of one of said shafts having a peripheral surface consisting of at least two lobes of continuously varying radius and spaced circumferen,ially from each other by $(360/N)°$ where N equals the number of lobes; and
   b. at least a pair of Belleville springs, each having an internally lobed bore to mate with said end portion and a peripheral lobed surface consisting of at least two lobes of continuously varying radius and spaced circumferentially of each other by $(360/N)°$ where N equals the number of lobes;
   c. a pair of annular bolting flanges carried by and secured to an end portion of the other of said shafts and surrounding said Belleville springs and said end portion, each of said bolting flanges having a bore of substantially the maximum diameter of said lobed end portion and facing counterbores having internal configuration to mate with the lobed periphery of said springs; and
   d. means to draw said flanges together to deflect said springs into firm gripping engagement with the lobed end portion of said one shaft and the counterbores of said bolting flanges.

* * * * *